(12) United States Patent
Andrt

(10) Patent No.: US 7,411,158 B2
(45) Date of Patent: Aug. 12, 2008

(54) HEATED LAMINATED GLAZING

(75) Inventor: Jan Andrt, Komarov (CZ)

(73) Assignee: Saint-Gobain Glass France, Courbevoie (FR)

(*) Notice: Subject to any disclaimer, the term of this patent is extended or adjusted under 35 U.S.C. 154(b) by 163 days.

(21) Appl. No.: 10/578,326

(22) PCT Filed: Nov. 3, 2004

(86) PCT No.: PCT/FR2004/002818

§ 371 (c)(1),
(2), (4) Date: May 4, 2006

(87) PCT Pub. No.: WO2005/048656

PCT Pub. Date: May 26, 2005

(65) Prior Publication Data

US 2007/0108175 A1 May 17, 2007

(30) Foreign Application Priority Data

Nov. 7, 2003 (DE) ................. 103 52 464

(51) Int. Cl.
*B60L 1/02* (2006.01)
(52) U.S. Cl. ............... 219/203; 219/202; 219/522; 219/543
(58) Field of Classification Search ........... 219/203, 219/202, 522, 543
See application file for complete search history.

(56) References Cited

U.S. PATENT DOCUMENTS

| 2,878,357 | A | | 3/1959 | Thomson et al. |
| 4,119,425 | A | * | 10/1978 | Marriott ............... 65/107 |
| 4,284,452 | A | * | 8/1981 | Bethge et al. ............ 156/99 |
| 4,820,902 | A | * | 4/1989 | Gillery ............... 219/203 |
| 5,182,431 | A | | 1/1993 | Koontz et al. |
| 5,798,499 | A | | 8/1998 | Shibata et al. |

FOREIGN PATENT DOCUMENTS

| EP | 0 506 521 | 9/1992 |
| GB | 2 091 527 | 7/1982 |

* cited by examiner

*Primary Examiner*—Tu B Hoang
*Assistant Examiner*—Vinod D Patel
(74) *Attorney, Agent, or Firm*—Oblon, Spivak, McClelland, Maier & Neustadt, P.C.

(57) ABSTRACT

A heatable composite pane having a trapezoidal outline, including a heating area having heating wires embedded in the composite and at least two main busbars. The two main busbars connect ends of a first group of parallel heating wires electrically in parallel. The outer triangular surface of the trapezoidal outline includes at least a second group and a third group of parallel heating wires that can be fed electrically via busbars. The second group and the third group of heating wires have different lengths and are combined to be connected in parallel with the first group. The second group and the third group are electrically connected to one another in series such that an effective wire length between the two main busbars is increased to homogenize heating power in the triangular surface with heating power in the heating area.

18 Claims, 1 Drawing Sheet

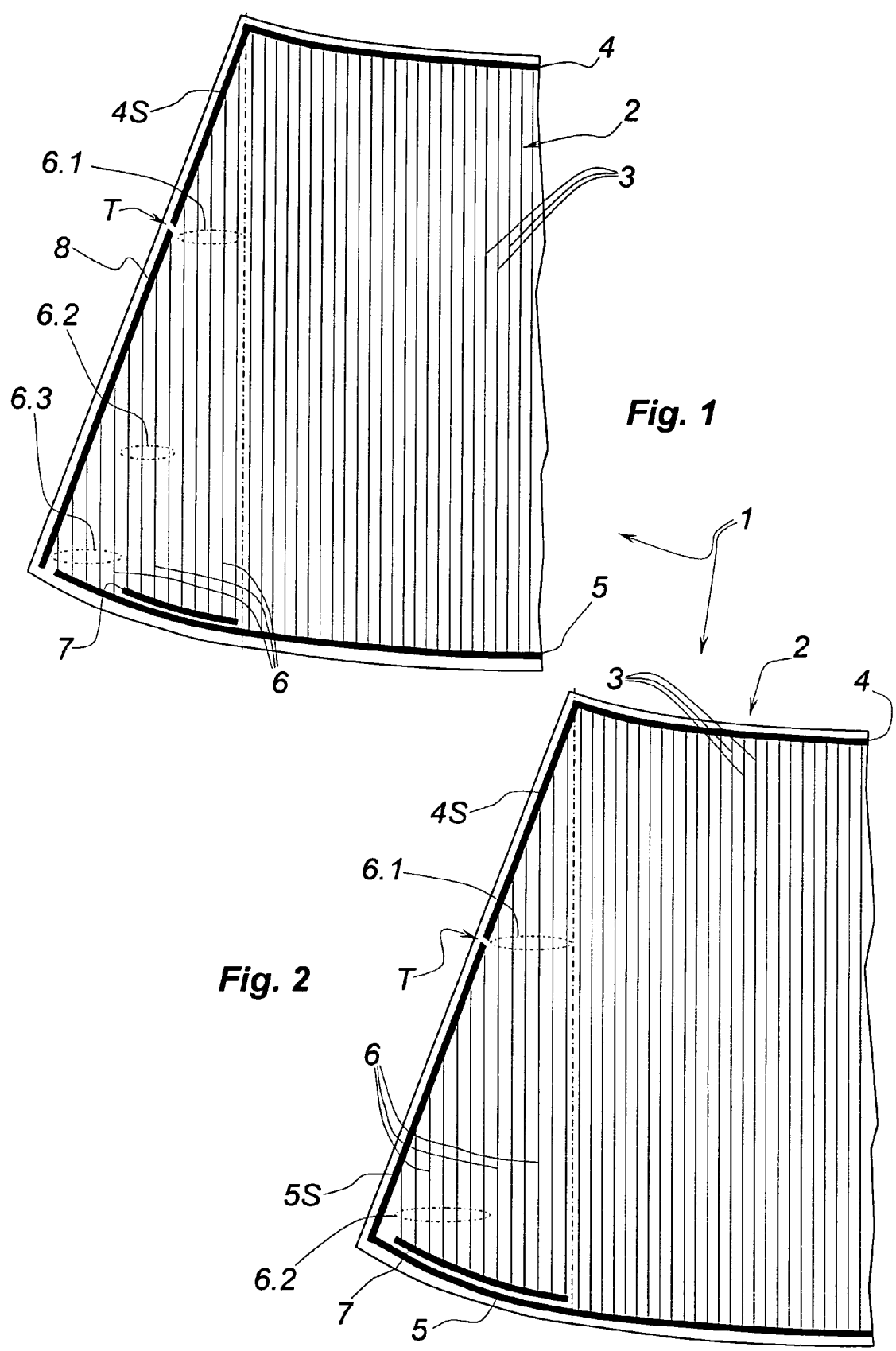

HEATED LAMINATED GLAZING

The invention relates to composite panes which can be heated by means of embedded wires.

DESCRIPTION OF THE PRIOR ART

U.S. Pat. No. 5,798,499 describes a pane such as this with a trapezoidal outline, whose outer triangular surfaces are covered, in the same way as their central surface area, with wires which run parallel to one another and to which a heating current is applied. In comparison with the wires which are laid in the central surface area and which are of approximately the same length, the effective lengths of the (side) wires in the triangular surfaces become ever shorter and therefore have lower resistance values for the same electrical resistance per unit length. Thus, if no further measures were taken, higher currents would flow here, which could lead to undesirable, and possibly unacceptable, temperature peaks.

In this case, the expression an approximately trapezoidal outline also means an outline having one or more curved or bent side edges. The longer edges of the trapezium are thus in any case curved in many heating panes of this kind. The shorter (side) edges, in contrast, are essentially linear.

The fundamental problem of uniform temperature distribution has already been solved in various ways according to the US Patent cited initially.

According to one advantageous embodiment, the shorter wires in the outer triangular surfaces are produced with smaller cross sections and thus with higher resistances, in order as far as possible to preclude local overheating. In one variant, the side heating wires are arranged such that they are separated from one another by greater distances than the wires which are arranged in the central heating area. The shorter wires then admittedly become hotter than their longer parallels, but the heat density is lower than in the central heating area. The material of the composite pane can therefore nonetheless dissipate the greater amount of heat without being damaged. The intermediate zones, which are not heated in this configuration, are effectively used as cooling surfaces.

The prior patent application DE 103 16 387.5-34 also discloses further options for the same problem. According to one advantageous embodiment, the side heating wires may have a supply voltage applied to them which is less than that applied to the wires arranged in the heating area, for example by providing a voltage divider or bias resistance within a busbar, or by the side heating wires being fed via separate busbars.

In another preferred embodiment, the side heating wires have a higher resistivity than the wires which are arranged in the central heating area. This allows the side heating wires to be supplied with the same feed voltage as the heating area, without any risk of local overheating. This can be achieved by using different materials for the wires in the heating area and for the side wires, resulting in different resistances per unit length from the material, even with the same wire thickness. In the case of wires composed of identical material, for example of tungsten as is generally preferred for strength reasons, resistance differences may be achieved, for example, by means of alloys or by means of different diameters/cross sections.

Finally, if the power busbars are split in a suitable manner, it is also possible to match the heating power of the shorter heating wires by applying a lower voltage to them.

The measures described above may be implemented both individually and in any desired combinations. Furthermore, it is not absolutely necessary to provide them symmetrically on the two outer triangular surfaces and, in fact, these embodiments may also differ from one another, if required.

Furthermore, in principle, it can be assumed that reduced heating power levels are achieved in the surface areas which are heated by the further heating wires because, in the preferred applications in vehicle windshields and rear windshields, the outer triangular surfaces are not in the preferred field of view of the vehicle occupants.

Furthermore, in principle, it is known (from EP-B1-773 705, EP-B1-788 294) for composite panes to have heating wires laid over their entire surfaces at irregular intervals, not parallel to one another and/or in curves. However, in comparison to the production of the panes mentioned above, this results in considerably more complex machines and control systems being required.

Finally, an arrangement is known (U.S. Pat. No. 2,878,357) from the field of film heaters for window panes, in which a transparent, electrically conductive coating on a pane with a trapezoidal outline is subdivided into a number of webs which are located alongside one another and can be connected electrically in series with one another by means of busbars which are in each case arranged alternately at the upper edge and lower edge of the webs. This results in a voltage divider, with the same current flowing in all of the webs. Overall, the total current flowing (even in the short webs) is limited to the value which the web with the highest resistance (and the highest voltage drop) still passes. For webs with the same width but with different lengths, it is not, however, possible to achieve a homogeneous heat distribution in this way.

U.S. Pat. No. 5,182,431 describes heating conductors which are produced by screen printing or by the laying of wires, which run essentially parallel and are of the same length being subdivided into four groups, which are connected in series using additional busbars. Overheating in the triangular side surfaces of the trapezoidal outline of the pane is avoided by the heating conductors running in a slightly divergent form between the two parallel side edges of the pane.

A central area with an increased heating temperature is created by deliberately reducing the number of conductors in specific groups of the series circuit or areas which should be given priority for heating, by setting the maximum current flow per heating conductor there, while a reduced current flows in each heating conductor in the other zones.

DE 101 26 869 A1 from the same applicant describes an asymmetrically trapezoidal composite pane which can be heated by means of wires and has a triangular side surface which is covered with wire loops which are fed from two busbars that are arranged closely alongside one another, parallel to one side edge. The wire loop is designed to be longer in the triangular area which is not as high than in the rectangular area, in order to compensate somewhat for its reduced resistance.

GB 2 091 527 describes a heatable pane with a trapezoidal outline which is equipped with heating conductors that are produced by screen printing, with the heating conductors extending at constant intervals between the two side edges, which are at an angle to one another. In order to prevent overheating in the area of the shorter heating conductors, some of the heating conductors are cut through, according to this document.

Against the background of the first-mentioned prior art, the invention is based on the object of providing a further solution to the problem of heating the outer triangular surfaces of a heatable composite pane with a trapezoidal outline as harmonically as possible.

DESCRIPTION OF THE INVENTION

According to the invention, the voltage divider application, which has already been mentioned as a solution approach in the prior application, can be achieved by connecting two or more heating wires, which are connected in parallel with one another, in series with one another in groups, with the groups being located alongside one another and being connected to one another with a low resistance by suitable additional power busbar sections or equivalent means. This is equivalent to lengthening the effective wire length between the two main power busbars and, it is therefore possible to provide the same (external) feed voltage for the side heating wires, possibly even with the same or reduced resistance values as those for the central heating area. There are a number of embodiment options for this purpose.

The solution according to the invention can advantageously be produced using conventional equipment for placing the heating wires on the films which are to be fitted in advance, since, in this case as well, the wire may in the simplest case be placed at equal intervals in the shape of a helix, and always parallel to one another, on the films, which are held on a mount which can rotate and is in the form of a drum.

When panes such as these according to the invention are also preferably used in vehicles as windshield or rear windshields then the specific embodiment covered with heating wires according to the invention may also be used for constructional applications.

Further details and advantages of the subject matter of the invention will become evident from the detailed description in the following text and from the drawing of an exemplary embodiment, in which, illustrated in a simplified form and not to scale:

FIG. 1 shows a first embodiment of the composite pane, in which three groups of heating wires which are parallel to one another are connected to one another in series as a voltage divider in an outer triangular area, and FIG. 2 shows a variant of the first embodiment, in which two groups of parallel heating wires are connected to one another in series as a voltage divider in an outer triangular area.

According to FIG. 1, an approximately rectangular heating area 2 having a family of heating wires 3 which are laid in straight lines parallel to one another is embedded in a manner known per se in a heatable composite pane 1 with an essentially trapezoidal (curved) outline. In this case, only about half of the pane 1 is illustrated; its other half is identical. The heating area 2 also has an upper busbar 4 and a lower busbar 5, which are likewise embedded in the composite in a manner known per se. This composite generally comprises two rigid panes of glass and/or plastic, and an adhesive layer which connects them over an area. The heating area and the busbars are embedded in the adhesive layer (for example a thermoplastic adhesive film composed of polyvinylbutyral "PVB" or ethylenevinyl acetate "EVA"), before these are laminated with the pane composite.

In the case of wire-heated composite panes, the busbars are generally composed of thin and narrow metal foil strips (copper, aluminum), which are applied before and/or after the application of the heating wires. The foil strips are precoated (pretinned) with a solder and are soldered to the wires, with the solder having to ensure that the (tungsten) wires are embedded as closely as possible. These features are known in the prior art. In comparison with the heating wires, all the busbars have negligible electrical resistances, and should not be heated up significantly during operation of the heating system.

The distances between the heating wires are illustrated only schematically here. As a rule, the wires are laid at very short distances (2-5 mm) from one another in order to achieve virtually homogeneous heating of the pane surfaces. In fact, they are also much thinner than can be illustrated here in comparison to the busbars 4 and 5. However, the available heating power levels per unit area for a given wire resistance can be set as required by varying the distances between them. Furthermore, the illustration in this case shows only wires laid in straight lines, for the sake of simplicity. However, in practice, the wires are slightly "wrinkled" in the normal manner, that is to say they are laid in a wave shape with short wavelengths and amplitudes, since this makes them far less visually conspicuous (in particular reducing light diffraction effects).

Since, in industrial large-scale manufacture, the sheets are laid continuously in a helical shape with the wires, at least two or more sheets generally resting on one mount in the form of a drum at the same time (see, inter alia, EP-B1-773 705, which was cited initially), the wires have to be cut through along their edges, in order to separate the films. The small inclination angle of the longitudinal axes of the wires with respect to the center axis of the pane, which results from the wires being laid in a helical shape, is not illustrated here, for the sake of simplicity.

Two (or even more) heating areas 2, which can be electrically fed separately, may be provided in the composite pane 1 in a manner known per se (with a vertical division, for example, in the center of the pane), and these must, of course, be connected to the respective voltage source via separate external connections. In this case, a common ground conductor may be used for both heating areas, so that only the busbar 4 or the busbar 5 need be subdivided into two sections, while the other is in each case continuous. In the first variant, four external connections are required, and in the second only three.

The external connections will not be described in any more detail here in their own right, since they have already been described many times in the prior art. In any case, with the configuration shown in FIG. 1, it is possible to arrange the connections such that they are physically adjacent at the two lower corners, or at one of the lower corners, of the composite pane 1.

The upper busbar 4 extends parallel to the upper, curved edge of the composite pane 1, is angled at both mutually adjacent corners and then runs—in a manner known per se—with a limb 4S over a significant portion of the length of the left-hand short side edge of the composite pane 1, as can be seen here, parallel to this, to the lower busbar 5. The latter extends virtually over the entire length of the curved lower edge of the composite pane 1, at approximately the same constant short distance from the edge of the pane.

The right-hand side of the composite pane (which cannot be seen here) is generally in the form of a mirror image. The details for the specific wire routing and arrangement will therefore always be explained in the following text only for the left-hand triangular side area of the pane 1.

A family of side heating wires 6 is arranged to the left of the heating area 2 in the outer triangular area of the composite pane 1. A dashed-dotted vertical line symbolizes the boundary between the central heating area 2 and the side wires 6. Their lengths decrease like a harp from right to left. The shorter wires therefore have lower electrical resistances, when made from the same material.

The composite pane according to the invention is covered in the left-hand outer triangular area with three groups of active heating wires which are connected in series and run parallel to one another (for illustrative purposes, the groups are combined by dashed-dotted ellipses). These heating wires 5 are preferably all composed of the same material. However, material variations are also possible, in order to match the local heating power level better. However, from the point of view of the manufacturing technique mentioned above, material changes in the laying of the wires are quite complex.

To the left of the dashed-dotted separating line between the central heating area 2 and the side area of the composite pane 1, there is first of all a first group 6.1 of heating wires which are still relatively long and are electrically connected at the top to the limb 4S of the busbar 4 (in the example there are five wires here). Their lower end is electrically connected to an additional busbar section 7, which is electrically independent of the busbar 5, and, in particular, does not have its own external connection. It runs parallel to the busbar 5, a short distance away from it, and is used only as a connecting line for the current flowing in the group 6.1 to a second group 6.2 of heating wires (of medium length; in this case with four wires), which extends from the bottom (section 7) to a further separate busbar section 8.

The latter is located along the left-hand edge of the pane 1, axially aligned with the limb 4S, forming, so to speak, its extension, without having to be directly electrically connected to it, however. Like the section 7, however, the latter does not have its own electrical external connection, either. It can easily be produced by cutting through the long limb 4S, which is shown in FIG. 1, at a separation point T between two heating wires in different groups. This separation point is also shown with an exaggerated width here.

A third group 6.3 of heating wires which are now only very short extends from the busbar section 8 to the busbar 5, thus forming the final link in the series circuit.

On the assumption that the heating current through the wires flows from the busbar 4 to the busbar 5, it thus flows from top to bottom (busbar 7) in the group 6.1, upwards (busbar 8) in the group 6.2, and from top to bottom again in the group 6.3.

The total current flowing in the side heating wires of the three groups is governed by the group having the highest electrical resistance. Since the total resistance of a group depends not only on the length of the wires but also on the number of wires within a group and, possibly, also on their resistance per unit length, a person skilled in the art can very easily achieve highly homogeneous heating in this area by deliberately combining the groups 6.1 to 6.3 as required. In addition, of course, it is possible to create one or more passive wires, which do not contribute to the heating power, in the groups 6.1, 6.2 and/or 6.3 by means of separation points of the type known per se.

If an identical wire material and the same number of active heating wires were to be used for the formation of all three groups, the group 6.1 with the longest wires would, of course, also have the highest resistance, thus governing the total current for a given voltage, and with this resistance in particular being considerably higher than the resistance of the group 6.3.

An experimental pane as shown in FIG. 1 is manufactured with heating wires 3 having a resistance of 150 Ω/m and side heating wires 6 with 100 Ω/m in the heating area 2. The side heating wires thus had an even lower resistance per unit length than the heating wires 3. This was evident from the thermography, which showed that this subdivision into three groups allowed very good homogenization of the triangular areas with the heating area 2—with the exception of the outer groups 6.3 which, in the chosen arrangement, obviously carried insufficient current for them even to become only warm.

Nevertheless, a configuration in which the resistances of the three groups are the same as one another will also not necessarily lead to the same heating power being emitted in all places.

As variant to the embodiment shown in FIG. 1, FIG. 2 shows a subdivision into only two groups 6.1 and 6.2 of parallel heating wires. This configuration requires only a single additional busbar 7, which once again runs parallel to the busbar 5, a short distance away from it. However, this requires an extension to the busbar 5 around the lower left-hand corner of the composite pane 1 by means of a limb 5S, analogously to the limb 4S of the upper busbar (or some equivalent measure by means of which the upper ends of the wires in the group 6.2 are jointly connected with a low resistance to the busbar 5).

In the present exemplary embodiment, the two limbs 4S and 5S, which extend on the same axis, end in the immediate vicinity of one another approximately at mid-height on the composite pane 1, or on its side edge. If required, external connections for the two busbars 4/4S and 5/5S could be arranged directly alongside one another at this point, on both sides of the gap T.

However, in this case, it would likewise be possible (in contrast to the illustration) for the external connections for the busbars 4 and 5 to be placed at a lower or upper corner of the pane 1. For this purpose, by way of example, the limb 4S in FIG. 1 would have to be lengthened parallel to the additional busbar 8, and in FIG. 2 would have to be lengthened parallel to the limb 5S as far as the left-hand lower corner.

As in the configuration shown in FIG. 1, the group 6.1 starts at the limb 4S and ends at the additional busbar section 7. Starting from this point, the second group 6.2 once again runs upwards and ends in the limb 5S. This also applies to the current, once again on the assumption that it flows from the busbar 4 to the busbar 5. In the group 6.1, it flows downwards, and in the group 6.2 upwards.

The detailed design of the two groups 6.1 and 6.2 in FIG. 2 is the same as that which has already been described for the groups 6.1 to 6.3 in FIG. 1. Once again, the side heating wires 6 were designed with a resistance of only 100 Ω/m, and the heating wires 3 with 150 Ω/m.

The thermographically best result of all the samples was achieved with the embodiment shown in FIG. 2. This allowed virtually complete homogenization of the heating power to be achieved over the entire surface of the composite heating pane, to be precise after heating durations of both 4 minutes and 8 minutes. The rated power at 12 V was 477 W (total current approximately 41 A), and is thus completely within the range of the customer specification. No unacceptable heat peaks occurred at any point.

With regard to the method of laying the wires, as described further above, it should be noted that, of course, wires which could connect the additional busbars 7 in FIGS. 1 and 2 directly to the busbar 5 must be cut through; if appropriate, the relevant short sections may be entirely removed from the composite once they have been cut through. This then also in fact results in the appearance of there being no wires, as illustrated for simplicity in the two figures, in the narrow space between 7 and 5.

The edge of the composite pane 1 and thus also the busbars 4 and 5, as well as 7 and 8 and, if appropriate, their external connections, to the extent that they project beyond the edge of the pane may be coated in a known manner with an opaque colored frame, which is not illustrated here so that the busbars can be seen.

Finally, it should be noted that, although electrical external connections are not required on the busbar sections 7 and 8 for heating purposes, it would also be possible, for example, if the composite pane were (additionally) to be used as an antenna pane, for these additional busbars to be used for tapping off antenna potentials, for example for a diversity application, as in the busbars 4 and 5 and their limbs, as well. By way of example, a separate external connection to the busbar 5 would then have to cross the busbar 5, isolated from it, and in a manner known per se, in order to make contact with the busbar 7 from the outside.

The invention claimed is:

1. A heatable composite pane, comprising:
   a heating area including heating wires embedded in the composite pane, the composite pane having a trapezoidal outline;
   at least two main busbars that connect ends of a first group of heating wires to one another electrically in parallel and that are located opposite along side edges of the composite pane, which run parallel to one another, and at least one of the busbars extends along the side edge in an area of an outer triangular surface of the trapezoidal outline, wherein
   the outer triangular surface of the trapezoidal outline includes at least a second group and a third group of heating wires that can be fed electrically via the busbars and that run essentially parallel to one another,
   in the area of the outer triangular surface, heating wires in the second group and the third group have different lengths and are combined to be connected in parallel with the first group, and
   the second group and the third group are electrically connected to one another in series such that an effective wire length between the two main busbars is increased, to homogenize heating power in the triangular surface with heating power in the heating area.

2. The heatable composite pane as claimed in claim 1, further comprising:
   an additional busbar configured to connect the second group and the third group of heating wires.

3. The heatable composite pane as claimed in claim 2, wherein the additional busbar is arranged in parallel with the two main busbars.

4. The heatable composite pane as claimed in claim 1, wherein a number of wires in the first group, the second group, and the third group of heating wires is different.

5. The heatable composite pane as claimed in claim 1, wherein limbs of the two main busbars also extend along at least one side edge in the area of the outer triangular surfaces of the trapezoidal outline, and end on both sides of a separation point.

6. The heatable composite pane as claimed in claim 5, wherein external connections of the two main busbars are arranged in an area of free ends of the limbs on both sides of the separation point.

7. The heatable composite pane as claimed in claim 1, wherein external connections of the two main busbars are connected in a physically adjacent form close to a corner of the composite pane.

8. The heatable composite pane as claimed in claim 1, wherein at least one of the busbars is subdivided into two electrically separate sections, each of which includes an external connection.

9. The heatable composite pane as claimed in claim 1, wherein the heating wires in the outer triangular surface have an electrical resistance per unit length that differs from that of the heating wires in the central heating area.

10. The heatable composite pane as claimed in claim 9, wherein the heating wires in the outer triangular surface have a higher resistance than the heating wires in the central heating area.

11. The heatable composite pane as claimed in claim 9, wherein the heating wires in the outer triangular surface have a lower resistance than the heating wires in the central heating area.

12. The heatable composite pane as claimed in claim 1, including an edge area provided with an opaque colored strip that optically coats the busbars.

13. The heatable composite pane as claimed in claim 1, wherein the heatable composite pane is a windshield or a rear windshield in a vehicle.

14. The heatable composite pane as claimed in claim 1, wherein the busbars are located on a perimeter of the composite pane such that none of the heating wires extend outside of the busbars.

15. The heatable composite pane as claimed in claim 1, wherein the first group, the second group, and the third group of the heating wires are substantially perpendicular to parallel edges of the trapezoidal outline of the composite pane.

16. The heatable composite pane as claimed in claim 1, further comprising:
   a fourth group of heating wires located in the outer triangular surface; and
   an additional busbar configured to connect the fourth group of heating wires in series with the third group of heating wires.

17. A heatable composite pane, comprising:
   a first group of substantially parallel heating wires embedded in the composite pane and traveling from a top region of the composite pane to a bottom region of the composite pane;
   a second group of substantially parallel heating wires embedded in the composite pane and traveling from a side region of the composite pane to the bottom region of the composite pane;
   a third group of substantially parallel heating wires embedded in the composite pane and traveling from the side region of the composite pane to the bottom region of the composite pane;
   a fourth group of substantially parallel heating wires embedded in the composite pane and traveling from the side region of the composite pane to the bottom region of the composite pane;
   a first busbar extending along the top region and a portion of the side region of the composite pane and receiving top ends of the first group and the second group of heating wires;
   a second busbar provided at the bottom region of the composite pane and receiving bottom ends of the first group and the fourth group of heating wires to connect the first group of heating wires in parallel with a combination of the second group, the third group, and the fourth group of heating wires;
   a third busbar provided at the bottom region of the composite pane and receiving bottom ends of the second group and third group of heating wires to connect the second group and third group of heating wires in series; and
   a fourth busbar provided at the side region of the composite pane and receiving top ends of the third group and the fourth group of heating wires to connect the third group and fourth group of heating wires in series, wherein the composite pane has a trapezoidal shape.

18. A heatable composite pane, comprising:

a first group of substantially parallel heating wires embedded in the composite pane and traveling from a top region of the composite pane to a bottom region of the composite pane;

a second group of substantially parallel heating wires embedded in the composite pane and traveling from a side region of the composite pane to the bottom region of the composite pane;

a third group of substantially parallel heating wires embedded in the composite pane and traveling from the side region of the composite pane to the bottom region of the composite pane;

a first busbar extending along the top region and a first portion of the side region of the composite pane and receiving top ends of the first group and the second group of heating wires;

a second busbar provided at the bottom region and a second portion of the side region of the composite pane and receiving bottom ends of the first group and top ends of the third group of heating wires to connect the first group of heating wires in parallel with a combination of the second group and the third group of heating wires; and a third busbar provided at the bottom region of the composite pane and receiving bottom ends of the second group and the third group of heating wires to connect the second group and the third group of heating wires in series, wherein the composite pane has a trapezoidal shape.

* * * * *